(12) United States Patent
Foers (10) Patent No.: US 6,425,596 B1
(45) Date of Patent: Jul. 30, 2002

(54) VEHICLE WINCH ARRANGEMENT

(76) Inventor: John Arthur Foers, Foers Engineering, Gateway Industrial Estate, The Gateway Parkgate, Rotherham, South Yorkshire, S62 6JL (GB)

(*) Notice: Subject to any disclaimer, the term of this patent is extended or adjusted under 35 U.S.C. 154(b) by 0 days.

(21) Appl. No.: 09/547,891

(22) Filed: Apr. 12, 2000

(51) Int. Cl.$^7$ .................................................. B66D 3/00
(52) U.S. Cl. ........................ 280/186; 254/323; 254/335
(58) Field of Search ................................. 280/186, 190; 254/47, 48, 266, 272, 280, 283, 323, 325, 326, 334, 335, 338; 414/542

(56) References Cited

U.S. PATENT DOCUMENTS

| | | | |
|---|---|---|---|
| 1,378,734 A | * 5/1921 | Steinberg | 254/280 |
| 1,453,231 A | * 4/1923 | Wheelock | 254/280 |
| 2,533,972 A | * 12/1950 | Symonds et al. | 254/280 |
| 3,788,605 A | 1/1974 | Johnson | |
| 3,946,991 A | * 3/1976 | Eriksson | 254/323 |
| 4,127,295 A | 11/1978 | Robinson | |
| 4,778,126 A | * 10/1988 | Spann, Jr. | 254/325 |
| 4,950,010 A | 8/1990 | Denny | |
| 5,393,194 A | 2/1995 | Smith | |

FOREIGN PATENT DOCUMENTS

| | | |
|---|---|---|
| DE | 949 866 | 9/1956 |
| GB | 2 246 754 A | 2/1992 |

* cited by examiner

*Primary Examiner*—Brian L. Johnson
*Assistant Examiner*—Christopher Bottorff
(74) *Attorney, Agent, or Firm*—St. Onge Steward Johnston & Reens LLC (57) ABSTRACT

A winch arrangement fitted to a vehicle chassis (1) comprises a winch (2) mounted at an intermediate position between chassis front end (3) and chassis rear end (4), and a winch cable (5) extended from the winch (2) to a pulley block (6) mounted on the chassis rear end (4). The pulley block (6) turns the cable (5) and the cable is passed through a fore and aft guide member (13) to the chassis front end (3). Stop members (14, 15) are provided to stop recovery of the cable (5) on to the winch (2) in a predetermined position. For rearward winching, the pulley block (6) is dismounted by a removable pin (7) and cable attachment (11) is secured to a load or an anchor point, and for forward winching cable attachment (15) can be pulled out and secured to a load or an anchor point whilst pulley block (6) is left mounted. For simultaneous rearward and forward winching, both cable attachments (11, 15) can be secured to a load or an anchor point.

15 Claims, 5 Drawing Sheets

VEHICLE WINCH ARRANGEMENT

FIELD OF INVENTION

The present invention relates to a vehicle winch arrangement and more specifically to such an arrangement which enables a pull to be applies selectively in either the fore or aft direction of the vehicle.

BACKGROUND OF THE INVENTION

One example of a winch arrangement of this kind is disclosed in U.S. Pat. No. 4,127,295, in which a cable winch unit is fitted directly behind the front bumper of a truck. The winch unit comprises a winch from which a cable extends towards the front of the truck to provide forward pulling and cable guide pulleys mounted in the front bumper which enable the cable to be guided along the front face and around one end of the bumper to be directed towards the rear of the truck for rearward pulling.

However, this known arrangement requires the cable to be routed around the external side of the truck during a rearward pull which could cause damage to the vehicle in the likely event of an accidental slew. It also only enables a forward or a rearward pull to be carried out, but not simultaneous pulling in both directions. The positioning of the winch directly behind the front bumper could also cause a number of problems. These problems may include poor winching stability due to the highest loads being borne by the corner bumper pulleys which would be cantilevered out from the ends of the front bumper, thus creating large bending and twisting moments on a relatively frail component and rendering the vehicle prone to unintentional slewing; imperfect layering of the cable on the Winch drum when being used for a rear or side pull as the cable would tend to build up on one side of the drum; and increase in the vehicle's moment of inertia in pitch and yaw which would have an adverse effect on the vehicle's handling characteristics.

U.S. Pat. No. 5,393,194 discloses a game-handling apparatus mounted on a four-wheel all-terrain vehicle to which a winch is fixed. The apparatus includes a first roller mounted on the front of the vehicle above the winch for guiding the winch line from the vehicle upwardly, a roll bar secured to the vehicle and fitted with a middle pulley for guiding the winch line rearwardly, and a rear roller attached to the rear of the vehicle for guiding the winch line downwardly behind the vehicle. A game animal can be attached to the end of the winch line to lift the animal onto the vehicle.

It is therefore an object of the present invention to provide a vehicle winch arrangement which enables a large number of winching modes to be carried out including simultaneous forward and rearward pulling, and also increases winching stability.

SUMMARY OF THE INVENTION

Accordingly, one aspect of the present invention consists in a vehicle fitted with a winch having a winch cable extendable from the vehicle to apply a pull in one fore and aft direction of the vehicle, and guide means about which the cable can be turned so as selectively to apply a pull in the opposite direction, the guide means comprising a guide member at or adjacent one end of said vehicle and about which the cable leading from the winch is turned towards the opposite end of the vehicle, and fore and aft guide means guiding the cable to the opposite end of the vehicle, characterized in that said guide member is removable from the vehicle for attachment to a load or an anchor point, and in that stop means are provided on the cable for stopping recovery of the cable onto the winch in a predetermined direction.

The present invention thus provides three basic winching modes comprising:

1) to carry out pulling in one direction, the cable is extended out of the end of the fore and aft guide means and it is secured to a load or an anchor point, whilst the guide member is on the vehicle;
2) to carry out pulling in the opposite direction, the guide member is removed and secured to a load or an anchor point, whilst the cable remains in the fore and aft guide means; and
3) to carry out pulling simultaneously in both directions, both the guide member and the cable end are extended out and secured to a load or an anchor point.

From a still further aspect, the invention consists in a chassis for a vehicle, said chassis being fitted with a winch having a winch cable extendable from the chassis to apply a pull in one fore and aft direction of the chassis, and guide means about which the cable can be turned so as selectively to apply a pull in the opposite direction, the guide means comprising a guide member at or adjacent one end of the chassis and about which the cable leading from the winch is turned towards the opposite direction of the chassis, and fore and aft guide means guiding the cable to the opposite end of the chassis, characterized in that said guide member is removable from the chassis for attachment to a load or an anchor point, and in that stop means are provided on the cable for stopping recovery of the cable onto the winch In a predetermined direction.

BRIEF DESCRIPTION OF THE DRAWINGS

The invention will now be described by way of example with reference to the accompanying drawings, in which:

FIG. 6 shows some of the winching modes made possible by the present invention.

DETAILED DESCRIPTION OF THE DRAWINGS

Referring now to FIGS. 1 to 5, a winch arrangement is shown fitted to a chassis 1 of a vehicle (not shown). The winch arrangement comprises a winch 2 mounted on the chassis 1 at an intermediate position between chassis front end 3 and chassis rear end 4. A winch cable 5 extends from the winch 2 to a dismountable guide member comprising a pulley block 6 mounted in a housing 19

What is claimed is:

1. A vehicle adapted for providing a winch force in a multiple possible directions, comprising:
   a vehicle having a first end and a second end;
   a winch attached to said vehicle;
   a cable mounted onto said winch, said cable having a free end which is extendable from said winch towards said first end of said vehicle;

a guide member located proximate the first end of said vehicle, said guide member guiding said cable to cause said cable to turn towards said second end of said vehicle, such that said cable extends from said first end of said vehicle to said second end of said vehicle;

a cable guide formed of a tubular member through which said cable passes, said cable guide securing said cable to said vehicle as it extends from said first end of said vehicle to said second end of said vehicle;

a cable end element at said second end of said cable permitting attachment of said cable end to a load or anchor point;

said winch, cable and guide member cooperating to provide winch force in a direction as selected by the user, determined by the securing of said guide member to said first end of said vehicle or a load or an anchor point, and by placement of said cable end element at said second end of said vehicle or attachment thereof to a load or an anchor point.

2. A vehicle as claimed in claim 1, wherein said winch is placed at an intermediate position between said first end and second end of said vehicle.

3. A vehicle as claimed in claim 1, wherein said guide member is removably attached to said first end of said vehicle.

4. A vehicle as claimed in claim 3, wherein said guide member further comprises attaching means for securing said guide member to a load or anchor point.

5. A vehicle as claimed in claim 3, wherein said guide member comprises a pulley assembly.

6. A vehicle as claimed in claim 1, wherein said tubular member is affixed to a chassis of said vehicle.

7. A vehicle as claimed in claim 1, wherein said cable end element comprises a cable stop assembly comprising an enlarged cable end element sized to be stopped by an end of said cable guide, thereby preventing said cable end element from being pulled through said cable guide to said first end of said vehicle.

8. A vehicle as claimed in claim 1, further comprising supplemental cable guides spaced apart from said guide member, said cable being located between said supplemental cable guides.

9. A vehicle as claimed in claim 8, wherein said supplemental cable guides comprises pulleys located laterally of said guide member.

10. A vehicle adapted for providing a winch force in a multiple possible directions, comprising:

a vehicle having a first end and a second end;

a winch attached to said vehicle;

a cable mounted onto said winch, said cable having a free end which is extendable from said winch towards said first end of said vehicle;

a guide member which is removably attached to the first end of said vehicle and which has attaching means for securing said guide member to a load or anchor point, said guide member guiding said cable to cause said cable to turn towards said second end of said vehicle, such that said cable extends from said first end of said vehicle to said second end of said vehicle;

supplemental cable guides spaced apart from said guide member, said cable being located between said supplemental cable guides;

a cable guide formed of a tubular member through which said cable passes, said tubular member being affixed to a chassis of said vehicle, said cable guide securing said cable to said vehicle as it extends from said first end of said vehicle to said second end of said vehicle;

a cable end element permitting attachment of said cable end to a load or anchor point, said cable end element providing a cable stop preventing said cable end element from being pulled through said cable guide to said first end of said vehicle;

said winch, cable and guide member-cooperating to provide winch force in a direction as selected by the user, determined by the securing of said guide member at said first end of said vehicle or a load or an anchor point, and by placement of said cable end element at said second end of said vehicle or attachment thereof to a load or an anchor point.

11. A vehicle as claimed in claim 10, wherein said guide member comprises a pulley assembly.

12. A vehicle as claimed in claim 10, wherein said supplemental cable guides comprises pulleys located laterally of said guide member.

13. A vehicle as claimed in claim 12, wherein said winch is placed at an intermediate position between said first end and second end of said vehicle.

14. A chassis for a vehicle, said chassis having a first end and a second end and being fitted with:

a winch and a winch cable having a free end and being extendable from the winch towards said first end of said chassis;

a guide member provided at the first end of the chassis and about which the cable is turned towards said second end of said chassis;

a cable guide formed of a tubular member through which said cable passes, said tubular member being affixed to a chassis of said vehicle, for guiding the free end of the cable to the second end of the chassis;

a stopper provided on the cable for preventing retraction of said cable through said cable guide; and a securing mechanism for removably securing said guide member on said first end of said chassis, whereby said guide member is removable from the chassis for attachment to a load or an anchor point so that a pull is capable of being applied selectively from said one end of said vehicle or said second end of said vehicle.

15. A kit of parts for a winch arrangement for a vehicle, comprising:

a winch and a winch cable having a free end and being extendable from the winch in one direction;

a guide member about which the cable is intended to be turned in a direction opposite to said one direction;

a cable guide formed of a tubular member through which said cable passes, said tubular member being affixed to a chassis of said vehicle, for guiding the free end of the cable to the second end of the chassis;

a stopper provided on the cable for stopping recovery of the free end of the cable onto the winch; and a securing mechanism for removably securing said guide member at one end of said vehicle, whereby, in use, said guide member is removable from the vehicle for attachment to a load or an anchor point so that a pull is capable of being applied selectively in at least one of said one direction and said opposite direction.

* * * * *

UNITED STATES PATENT AND TRADEMARK OFFICE
CERTIFICATE OF CORRECTION

PATENT NO. : 6,425,596 B1
APPLICATION NO. : 09/547891
DATED : July 30, 2002
INVENTOR(S) : John Arthur Foers It is certified that error appears in the above-identified patent and that said Letters Patent is hereby corrected as shown below:

At Col. 2, line 58, insert:

"on the chassis 1 at the rear end 4.The pulley block is mounted in the housing by means of a removable pin 7 which passes through aligned holes 8,9 in the housing 19 and through eye 10 in a cable attachment 11 secured to the pulley block 6. The pin 7 is removable from the housing by-pulling out a small quick release pin 17 and once the pin 7 has been removed, the pulley block 6 and cable attachment 11 can be dismounted from the housing. The winch cable 6 passes around the pulley block 6 and is thereby turned towards the chassis front end 3 and is passed, via a guide roller 12, through a fore and aft guide member 13 mounted within the chassis 1. At the front end 3, stop members 14 are mounted on the end of the fore and aft guide member 13. These stop members cooperate with a cable attachment 15, such as a hook or an eye, secured to the end of the winch cable 5 so as to prevent the cable end from passing back down the fore and aft guide member 13 to the rear end 4.

Figure 1:
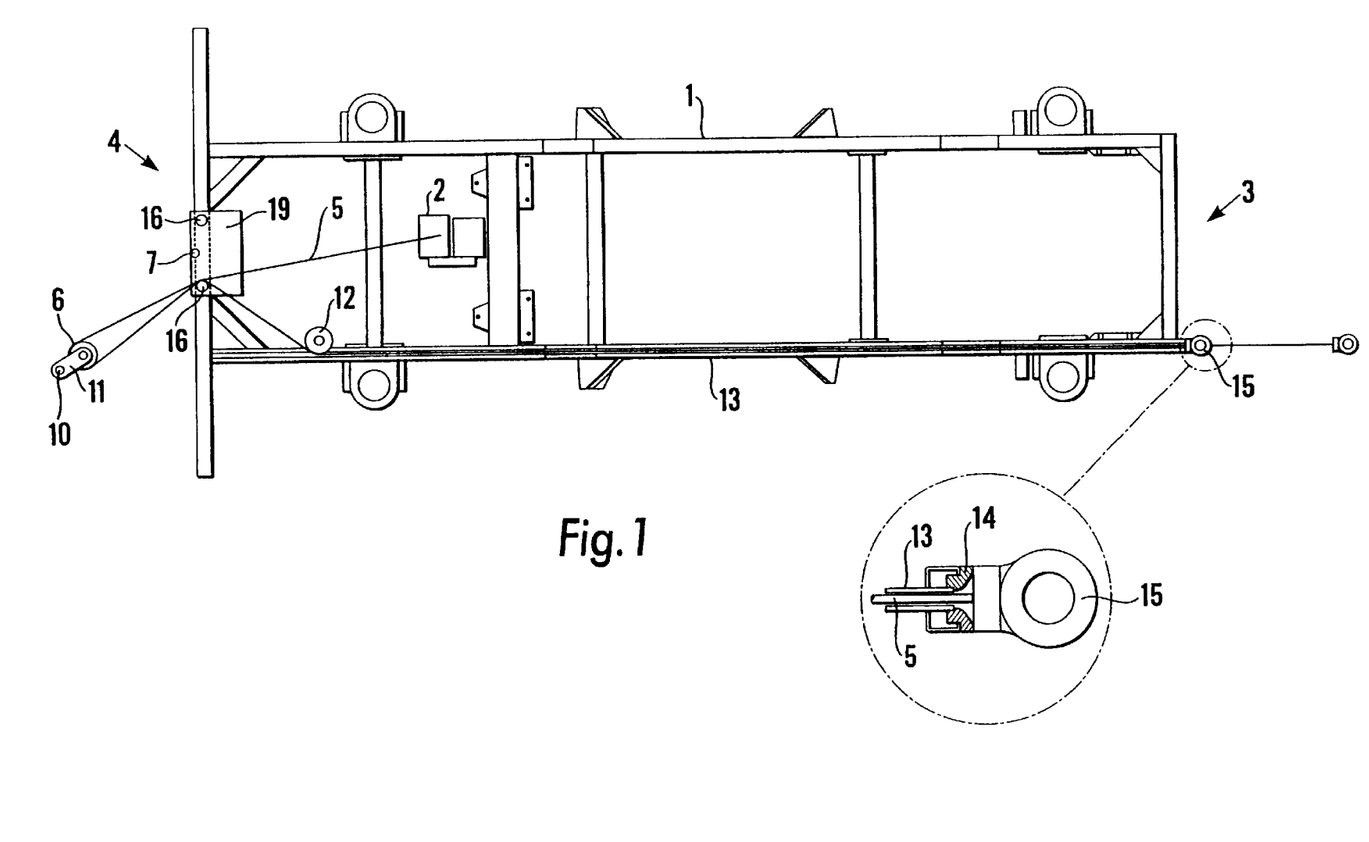
FIG. 1 shows a plan view of a chassis of a vehicle in accordance with one embodiment of the invention.

Circlip and roller assemblies 16 are mounted in the housing 19 at the chassis rear end 4 on either side of the pulley block 6 so as to guide the winch cable 5 when a rearward pull is performed in the direction of the longitudinal axis of the chassis 1, as shown in Figure 1, or at certain angles with respect to the longitudinal axis. At the front end 3, the stop members 14 are shaped so as to carry out the same function when a forward pull is performed at an angle to the longitudinal axis of the chassis.

Figure 2:
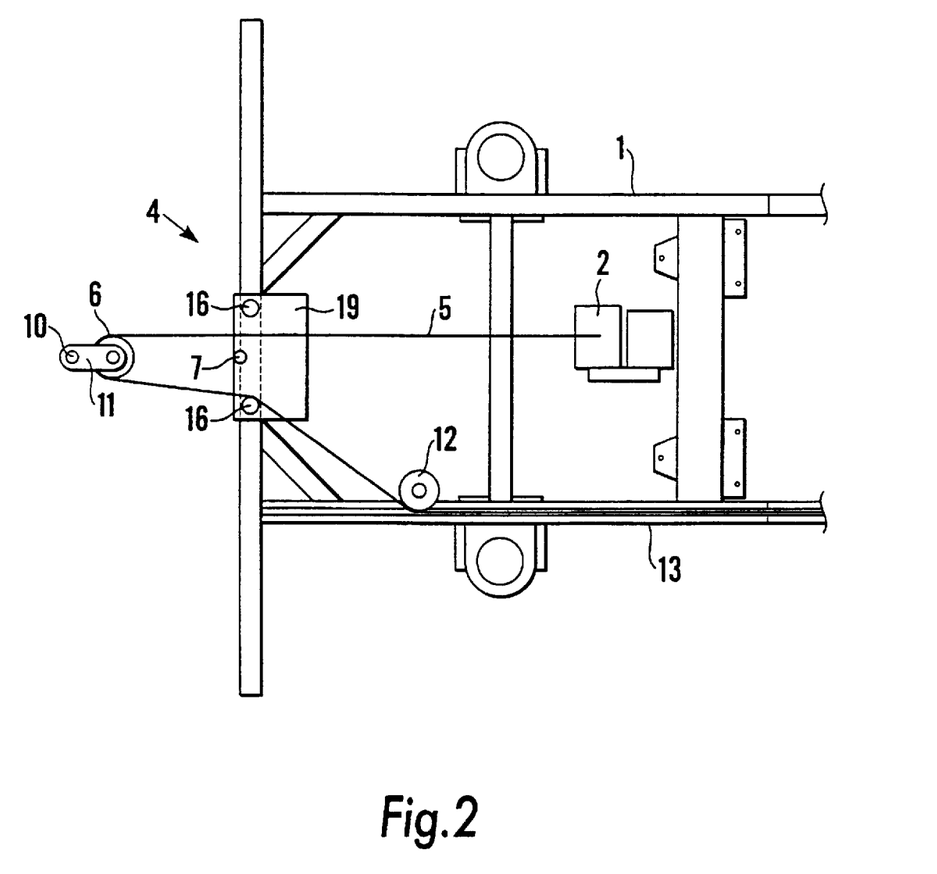
FIG. 2 shows a plan view of the rear end of the chassis in one winching mode.
Figure 3:
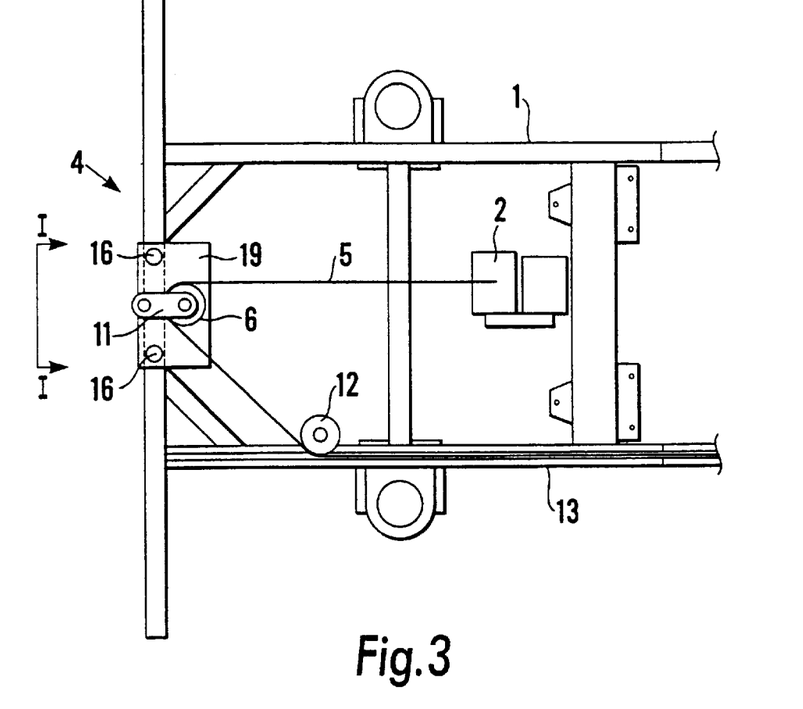
FIG. 3 shows a plan view of the chassis rear end in another winching mode.
Figure 4:
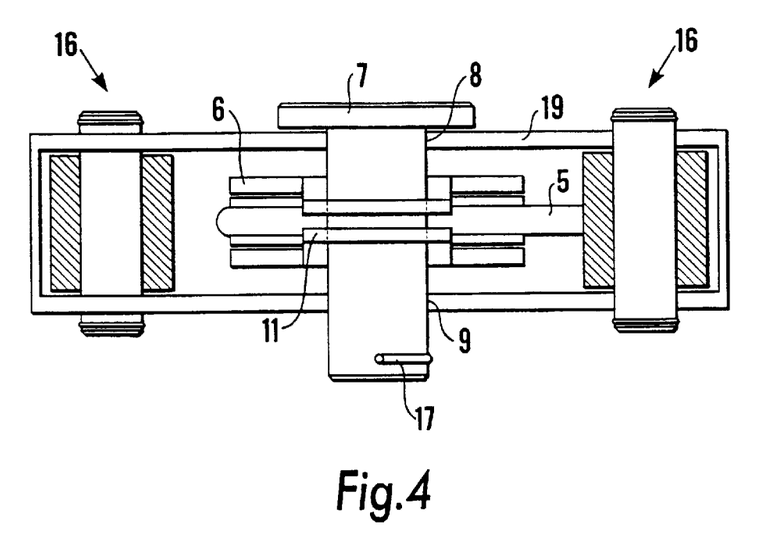
FIG. 4 shows a view along line I—I of FIG. 3.
Figure 5:
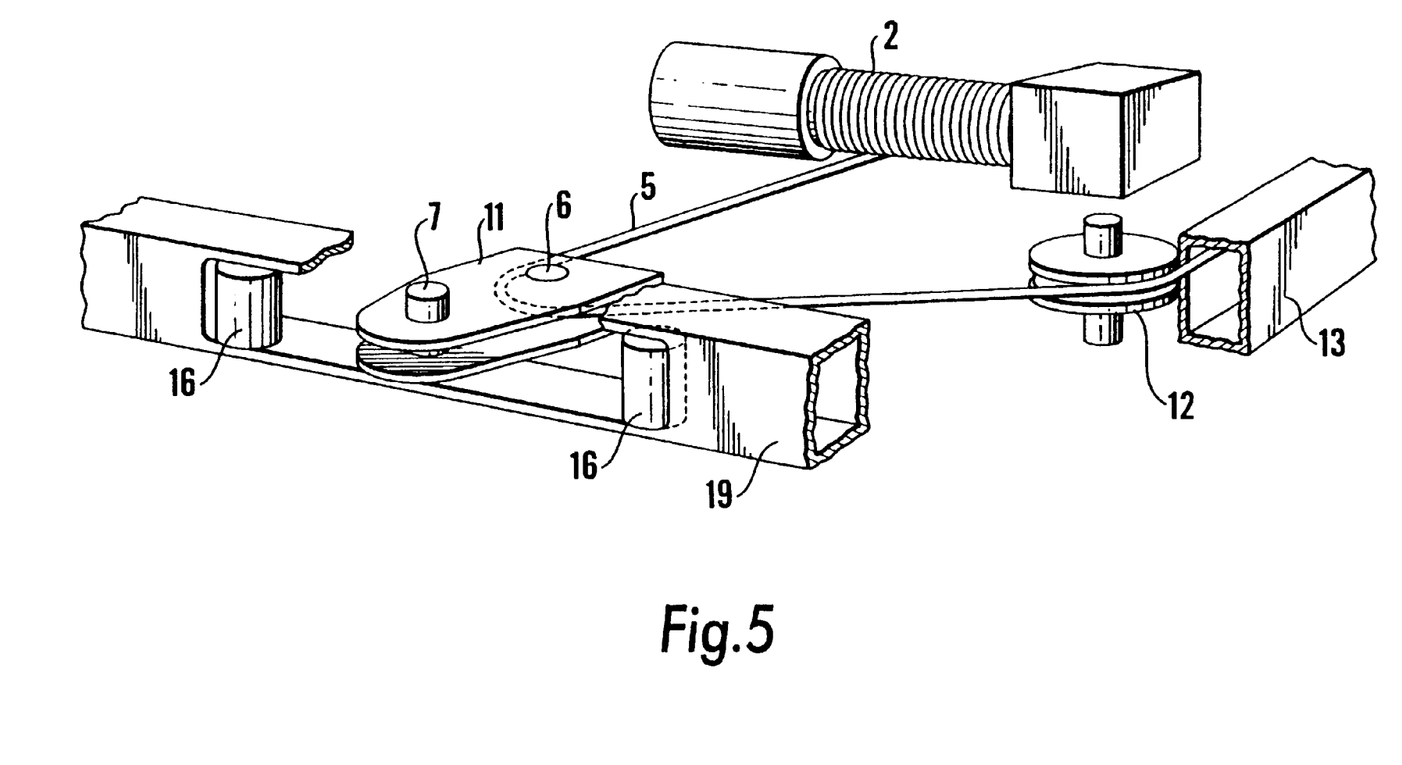
FIG. 5 shows a schematic perspective view of the winch arrangement.
Figures 61, 62, 63, 610, 611:
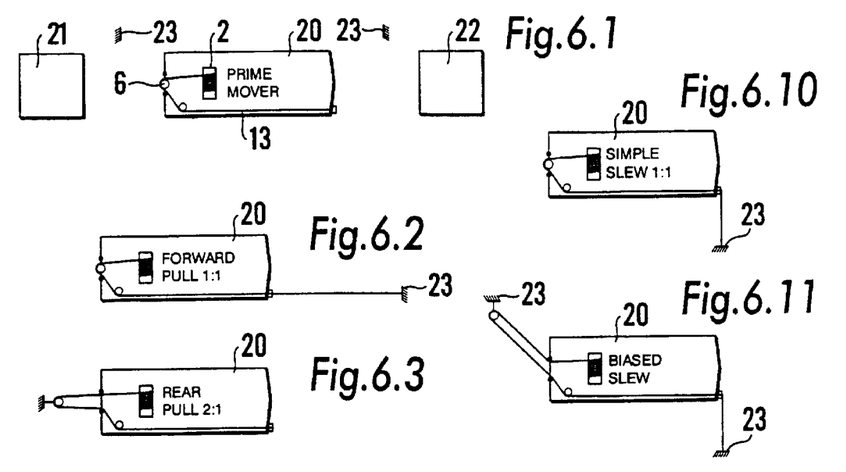
Figure 64:
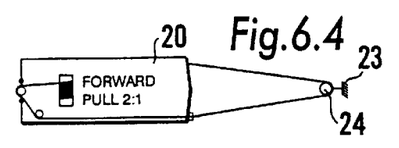
Figure 65:
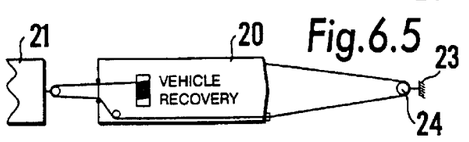

In use of the winch arrangement, there are three basis winching modes as follows:

1) to carry out a forward pull only, the pulley block 6 is left secured in the housing at the chassis rear end 4, as shown in Figure 3, and the cable attachment 15 is extended out of the fore and aft guide member 13 and secured to either a load or a suitable anchor point;

2) to carry out a rearward pull only, the pulley block 6 is dismounted from the housing, as shown in Figure 2, and the pulley block 6 and cable attachment 11 are extended out and secured to either a load or a suitable anchor point, whilst recovery of the cable 5 through the fore and aft guide member 13 is prevented by the stop members 14 cooperating with the cable attachment 15; and

UNITED STATES PATENT AND TRADEMARK OFFICE
CERTIFICATE OF CORRECTION

| | |
|---|---|
| PATENT NO. | : 6,425,596 B1 |
| APPLICATION NO. | : 09/547891 |
| DATED | : July 30, 2002 |
| INVENTOR(S) | : John Arthur Foers |

It is certified that error appears in the above-identified patent and that said Letters Patent is hereby corrected as shown below:

3) to carry out simultaneous forward and rearward pull, the pulley block 6 is dismounted and both the pulley block 6 and the cable attachment 15 are extended out in opposite directions and secured to a load or an anchor point.

If the load or anchor point is located at a position offset from the longitudinal axis of the vehicle chassis, the rollers 16 and/or the stop members 14 aid in guiding the winch cable 5 in the required direction, as shown in Figure 1.

Figure 6 shows a variety of winching modes make possible by the present winch arrangement. These are just some examples of the possible modes and many others could also be achieved. Figure 6.1 shows the layout of a vehicle 20, in accordance with the present invention, two loads 21, 22 and possible ground anchors 23 which may be applied or be naturally occurring fixed points, such as trees. Figures 6.2 to 6.4 show simple forward or rearward pulls by securing to anchor points 23. In Figures 6.3 and 6.4, a mechanical advantage of 2:1 is obtained, and in Figure 6.4 another pulley 24 is used and the cable end is secured back onto the other side of the front of the vehicle 20. In Figures 6.5 to 6.8, various modes are shown for recovery of either a single load or a double load providing mechanical advantages of 2:1 or 3:1. Figure 6.9 shows recovery of a load onto a trailer 25. Figures 6.10 to 6.13 show various slew arrangements in which the cable is secured to one or more anchor points offset from the longitudinal axis of the vehicle 20, and Figures 6.14 and 6.15 show side pull arrangements in which the cable is secured to one or more anchor points located at up to 90° to the longitudinal axis of the vehicle 20.

From the foregoing, it can be readily seen that the present invention has many advantages, which include the following: -

1. The winch cable is permanently located in the chassis of the vehicle, thereby removing the necessity to thread the cable around pulleys in order to winch in the desired direction. The cable attachment is simply pulled from its stored position at the front of the chassis for a forward pull, or the pulley block and cable attachment is pulled out of the rear of the chassis for a rearward pull.
2. It allows a simultaneous front and rear pull without the need to attach additional components to the winch cable.

UNITED STATES PATENT AND TRADEMARK OFFICE
CERTIFICATE OF CORRECTION

PATENT NO.         : 6,425,596 B1
APPLICATION NO. : 09/547891
DATED                  : July 30, 2002
INVENTOR(S)        : John Arthur Foers It is certified that error appears in the above-identified patent and that said Letters Patent is hereby corrected as shown below:

3. It allows the winch to be situated in a substantially central location of the vehicle, which has the following effects: -

3.1 it minimizes the vehicle's moment of inertia in pitch and yaw, which optimizes the vehicle's handling characteristics. Mounting a heavy winch at the extreme front or rear of a vehicle has an adverse effect on handling;

3.2 it keeps the front and rear of the vehicle free from projections so as not to spoil approach and departure angles. These are important features in an off-road vehicle and this arrangement has the ultimate approach and departure angles, both being 90°. Additionally, it does not compromise the off-road performance of the vehicle;

3.3 the absence of a front mounted winch makes for a more pedestrian-friendly vehicle, which is not a very important criterion for vehicle designers;

3.4 the relatively large distance between the winch drum and the first change in direction of the cable allows perfect layering of the cable onto the crum, thus optimizing the winch's performance and cable life;

3.5 winch security is enhanced as the winch can only be removed from inside the vehicle;

3.6 the winch is totally enclosed and protected from the elements and other external forces; and 3.7 it does not affect a vehicle's frontal deformation characteristics during impact. This is an important feature if airbag deployment has to be considered.

4. The winch cable passes down the inside of the chassis in a guide tube, out of harm's way, and reduces the dangers from cable recoil in the event of a tensile failure.

5. The winch loads are borne by substantial chassis members.

6. Winching stability is maximized by having the cable loads imposed on the vehicle close to its centre line,

UNITED STATES PATENT AND TRADEMARK OFFICE
CERTIFICATE OF CORRECTION

PATENT NO. : 6,425,596 B1
APPLICATION NO. : 09/547891
DATED : July 30, 2002
INVENTOR(S) : John Arthur Foers It is certified that error appears in the above-identified patent and that said Letters Patent is hereby corrected as shown below:

7. All pulleys are contained within the chassis when the vehicle is not winching.

8. The number of primary winching modes is manifold and, when subsequent combinations are taken into account, the number will probably run into hundreds.

Figure 66:
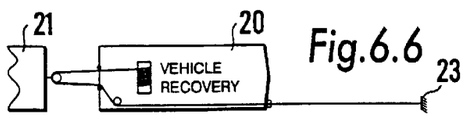
Figure 67:
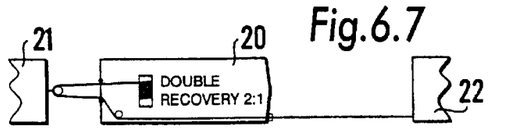
Figure 68:
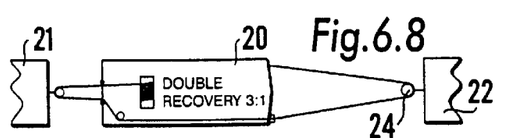
Figure 69:
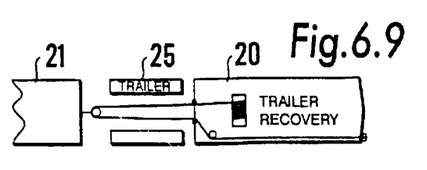
Figure 612:
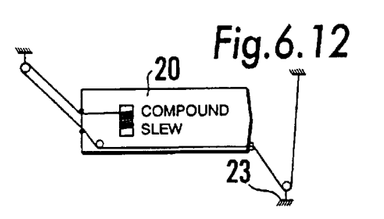
Figure 613:
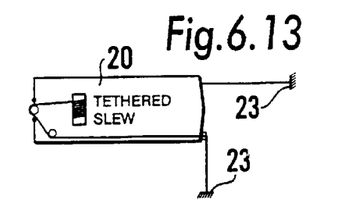
Figure 614:
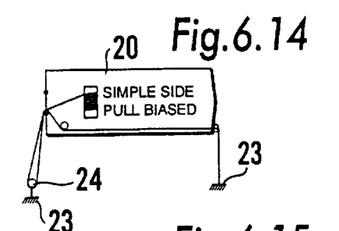
Figure 615:
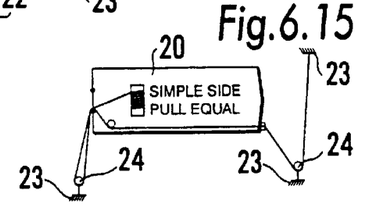

9. It is possible simultaneously to winch and also to drive the vehicle in the opposite direction to the cable movement so as to enable a more suitable anchor position to be obtained if necessary when used in the mode shown in Figure 6.6."

Signed and Sealed this

Eighth Day of August, 2006

JON W. DUDAS
*Director of the United States Patent and Trademark Office*